W. C. FARRELL.
COMPUTING SCALE.
APPLICATION FILED SEPT. 24, 1913.
1,131,126.
Patented Mar. 9, 1915.
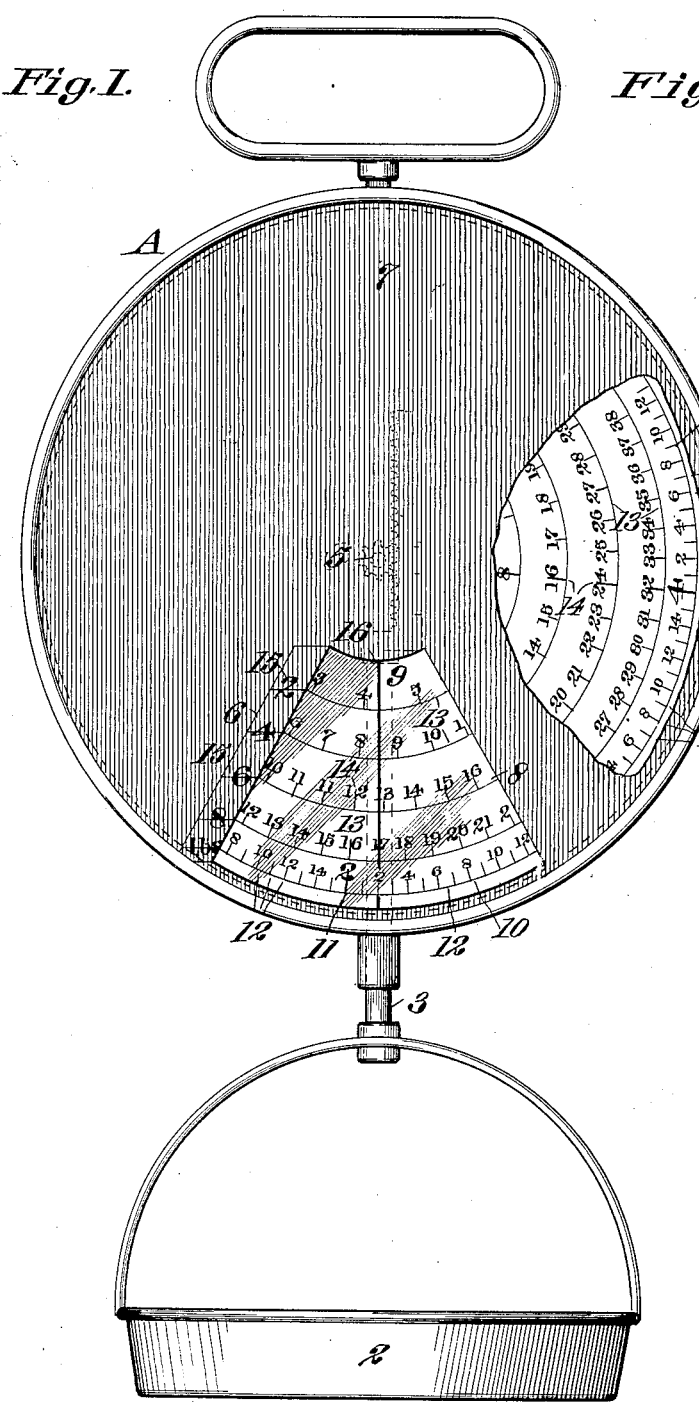
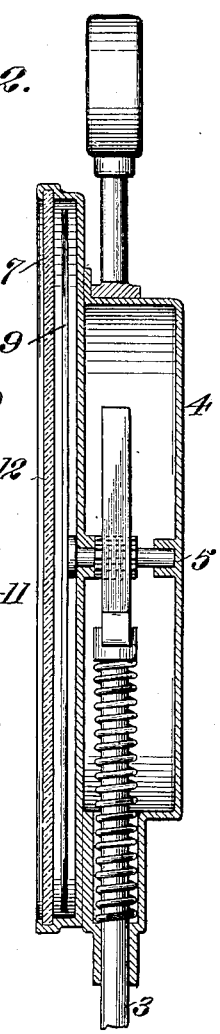
WITNESSES:
Charles Pekles
F. E. Maynard.
INVENTOR
William C. Farrell
BY G. H. Strong,
ATTORNEY

UNITED STATES PATENT OFFICE.

WILLIAM C. FARRELL, OF SAN JOSE, CALIFORNIA.

COMPUTING-SCALE.

1,131,126.   Specification of Letters Patent.   Patented Mar. 9, 1915.

Application filed September 24, 1913. Serial No. 791,499.

*To all whom it may concern:*

Be it known that I, WILLIAM C. FARRELL, a citizen of the United States, residing at San Jose, in the county of Santa Clara and State of California, have invented new and useful Improvements in Computing-Scales, of which the following is a specification.

This invention relates to weighing scales, and particularly to automatic price computing scales.

The object of the present invention is to provide a scale in which there is a revoluble disk bearing weight indicating graduations and price computations at different rates per pound, the rotary dial being connected to an arbor of the scale.

A further object of the invention is to provide an improved computing scale in which the weight of the article and the price at different rates per pound can be readily observed by the merchant and the customer; the rotary dial being movable with relation to a fixed rate indicator or scale in front of the dial.

The invention consists in combination with the spindle or arbor of a weighing scale, of a dial with graduations representing pounds and fractions of pounds, and other graduations representing the price of goods at different rates, the price scale having a fixed correlation with the weight scale so that when goods are sold at a predetermined rate per pound and the arbor swings the dial to indicate the weight, the registration with a hair line on the rate indicating scale of a mark on the dial will instantly indicate the correct weight and price.

The invention further consists of the parts and the construction and combination of parts as hereinafter more fully described and claimed, having reference to the accompanying drawings, in which,—

Figure 1 is a front elevation of the improved scale partly broken away, to show the dial. Fig. 2 is a sectional view of the scale.

In the drawings A represents a weighing scale, which is shown as provided with the usual tray 2 and spring rod 3; this entering the casing 4 and operating an arbor 5 when material to be weighed is placed upon the tray 2.

My present invention comprehends the provision of a fixed rate scale 6, which may be suitably produced upon a front 7, which may be of glass or other material, preferably a small segmental portion 8 being made of glass or other transparent material through which may be seen a revoluble dial 9, secured upon the arbor 5 of the scale. Upon the dial 9 and adjacent to its periphery is produced a weight scale indicated by the graduations 10, the scale being divided into fractions representing pounds, and indicated as by the numeral 11, the pound divisions of the dial being subdivided into divisions representing ounces or other units, as at 12.

Concentrically arranged upon the face of the dial 9 are other graduated scale rings 13, with divisions 14. The divisions 14 of each of the scale rings 13 are so proportioned that they will coincide with the respective radial pound marks 11 on the weight scale 10, and at each division 14 will be placed a multiple indicating the price of the corresponding number of pounds at a given rate, and each scale ring 13 is again subdivided into fractions which have a relative value in proportion to the fractional weight indicated between the pound graduations and the pound prices; the divisions 14 of the rings 13 each indicating progressively from zero of weight and price measure the cost of an article at a predetermined rate, which is found at the rate scale 6 on the face 7.

The rate scale 6 is provided with suitable lines and rate indications, the ends of the rate lines 6 intersecting with their respective concentric price scale lines 13 on the dial 9. Thus in the position shown in Fig. 1, when material has been placed upon the tray 2 of the scale, weighing for example two pounds and two ounces, the two pound, two ounce mark 12 will come into juxtaposition with a hair or reading line 16, preferably arranged in the plane of the lower vertical radius from the center of the arbor 5, and when the weight is so indicated the operator will then observe the price mark indicated at 17 according to the rate per pound at which the goods is being sold, the operator following from the rate scale 6 around its intersecting price circle 13 to the point of conjunction between that particular price circle and the reading line 16; whereupon the correct price at the given rate of the indicated weight of the goods will be found. In this instance, the example given shows goods selling at the rate of eight cents per pound, weighing two pounds two ounces, the selling price being seventeen cents.

It is understood that since the rate scale 6 is provided with figures at 15, indicating different rates, the price circles 13 will be divided into divisions which will indicate accurately the price of the goods per pound and fractions of a pound according to the given rate, so that the salesman and the customer may readily ascertain the price without computation, by figuring from the rate per pound indication around its intersecting price circle 13 to the price indicated at the junction of said circle with the reading line 16.

Having thus described my invention what I claim and desire to secure by Letters Patent, is:

In a computing scale, a casing having a segmental opening on its front face and at the lower portion of said front face, a radial hair-like reading line borne by the front face of the casing, and arranged centrally of the space between the sides of the opening, said casing having a divided fixed rate scale extending radially thereof and arranged on the front face of the casing adjacent to but beyond one of the sides of said segmental opening, a dial actuated by the tray member of the scale, said dial having a circular weight scale at the circumferential portion thereof, and a series of price scale rings between the center of the dial and the weight scale which price scale rings register with the respective divisions of the fixed rate scale, said hair-like reading line by reason of centrally bisecting the segmental opening enabling the scales on the dial to be read for equal distances on each side of the said reading line, all of the scales being in registry and readable circularly of the front face of the casing.

In testimony whereof I have hereunto set my hand in the presence of two subscribing witnesses.

WILLIAM C. FARRELL.

Witnesses:
 FLORENCE MOTSCH,
 ALBERT G. MOTSCH.